(12) United States Patent
Khan et al.

(10) Patent No.: US 8,206,808 B2
(45) Date of Patent: Jun. 26, 2012

(54) COMPOSITE PANELS HAVING IMPROVED FLUID IMPERMEABILITY

(75) Inventors: Subhotosh Khan, Midlothian, VA (US); Halvar Young Loken, Roseland, VA (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 13/033,914

(22) Filed: Jun. 2, 2011

(65) Prior Publication Data

US 2011/0274873 A1 Nov. 10, 2011

Related U.S. Application Data

(62) Division of application No. 12/417,691, filed on Apr. 3, 2009, now Pat. No. 7,927,691.

(51) Int. Cl.
*B32B 3/12* (2006.01)
*B32B 23/02* (2006.01)
*B32B 27/04* (2006.01)
*C08K 7/02* (2006.01)
*C08L 63/00* (2006.01)
*C08L 63/02* (2006.01)

(52) U.S. Cl. ........ 428/116; 428/118; 428/394; 428/395; 428/396; 523/448; 525/58; 525/107; 525/113; 525/114; 525/118; 525/120; 525/121; 525/423; 525/438; 525/454; 525/480; 525/502; 525/504; 525/508; 525/523; 525/524; 525/526

(58) Field of Classification Search .................. None
See application file for complete search history.

(56) References Cited

U.S. PATENT DOCUMENTS

| | | | |
|---|---|---|---|
| 2,999,788 A | 9/1961 | Morgan | |
| 3,767,756 A | 10/1973 | Blades | |
| 3,869,429 A | 3/1975 | Blades | |
| 3,869,430 A | 3/1975 | Blades | |
| 4,945,154 A | 7/1990 | Ghali et al. | |
| 5,789,059 A | 8/1998 | Nomoto | |
| 6,544,622 B1 | 4/2003 | Nomoto | |
| 7,771,810 B2 * | 8/2010 | Levit et al. | 428/116 |
| 7,785,520 B2 * | 8/2010 | Khan et al. | 264/320 |
| 2003/0114641 A1 * | 6/2003 | Kelly et al. | 528/501 |
| 2004/0191192 A1 | 9/2004 | Blankenbeckler et al. | |
| 2004/0220339 A1 | 11/2004 | Chen et al. | |
| 2004/0235586 A1 * | 11/2004 | Chen | 473/351 |

* cited by examiner

*Primary Examiner* — Robert Sellers

(57) ABSTRACT

A prepreg composite material that includes a fiber layer and a resin comprising a thermoset resin component, a curing agent and a fibrous micropulp. The micropulp component is an aramid fiber having a volume average length of from 0.01 to 100 micrometers. The prepreg is useful in composite panel construction for minimizing fluid permeation into the cured structure. This prepreg is particularly suitable for making honeycomb sandwich panels. Film adhesives, liquid and paste resins containing aramid fiber micropulp are also disclosed.

1 Claim, 3 Drawing Sheets

COMPOSITE PANELS HAVING IMPROVED FLUID IMPERMEABILITY

This is a divisional of application Ser. No. 12/417,691 filed Apr. 3, 2009, U.S. Pat. No. 7,927,691.

BACKGROUND OF THE INVENTION

1. Field of the Invention

This invention relates generally to structural panels made from composite materials and, in particular, to honeycomb sandwich panels.

2. Description of Related Art

Composite materials are used extensively in the aerospace industry and in other situations where high strength, stiffness and light weight are desired. Monolithic composite structures typically include fibers and polymer resin as the two principal elements. A wide range of fiber types has been used in composites. Glass, graphite, carbon and aramid fiber are common. The fibers can be chopped, randomly oriented, unidirectional in orientation or woven into fabric. The resin matrix is usually a thermoset material that includes resin, curing agents and other performance modifiers. A fibrous reinforcement (sheet, tape, tow, fabric or mat) pre-impregnated with resin is known as a prepreg.

Core structures are used for certain applications. Honeycomb is a popular core material for such panels because of its high strength to weight ratio and resistance to fatigue failures. Honeycomb cores are made from a wide variety of materials with aramid paper and aluminum being the most common. Prepreg facesheets are bonded to each side of the core.

Both monolithic and core composite structures have to be capable of maintaining an adequate mechanical performance after exposure to wet and moist environments. Honeycomb sandwich panels are particularly prone to moisture ingression into the cells of the core during service.

Technical reports on this subject include "Moisture Ingression in Honeycomb Core Sandwich Panels" by Cise et. al. in the Journal of Materials Engineering and Performance, Volume 6(6), 732, December 1997; "Caution, Honeycomb Core Can Be Dangerous To Your Program's Health" by Campbell in Corrosion Reviews, 25 (1-2), 13-26, 2007 and Loken et. al. in "Water Ingression Resistant Thin Faced Honeycomb Cored Composite Systems with Facesheets Reinforced with Kevlar® Aramid Fiber and Kevlar with Carbon Fibers" published by E.I. Du Pont de Nemours, Wilmington, Del.

SUMMARY OF THE INVENTION

In one embodiment, the present invention is directed to a prepreg for a composite structure having a resin component comprising a thermoset resin, at least one curing agent and a micropulp of high tenacity fiber, said high tenacity fiber having a volume average length of from 0.01 to 100 micrometers.

In one embodiment, this invention is also directed to the use of such a prepreg to function as a fluid impermeable barrier in a cured composite material panel.

In one embodiment, this invention also relates to alternative film, liquid or paste resin materials incorporating micropulp that serve to reduce fluid permeation in composite structures

DETAILED DESCRIPTION OF THE INVENTION

Figure 1A:
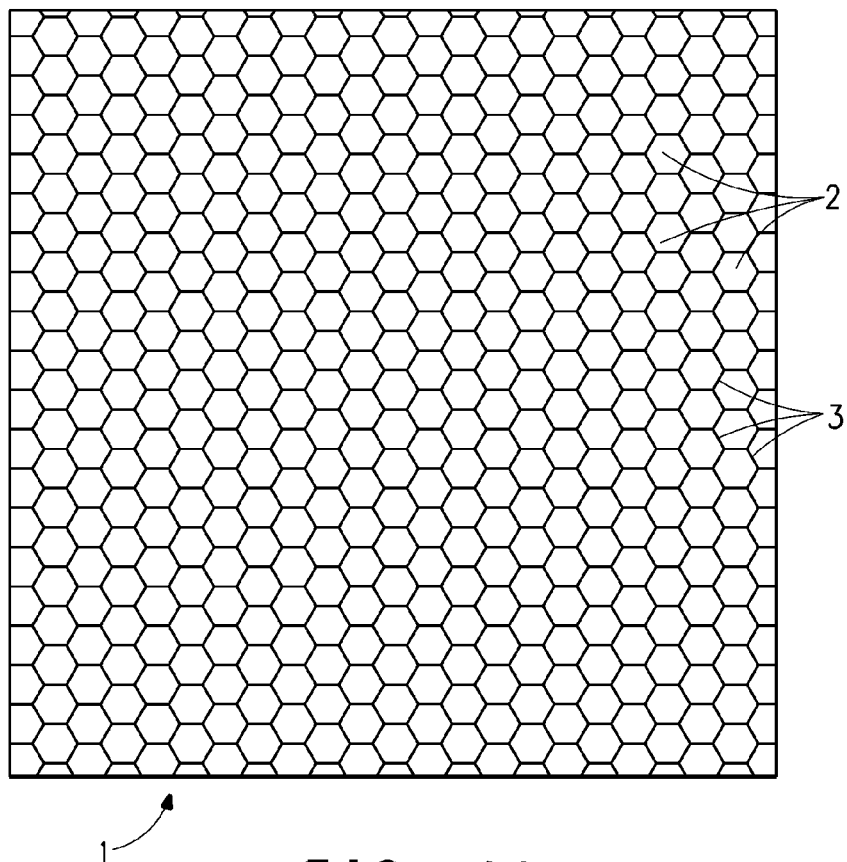
FIGS. 1A and 1B are representations of views of a hexagonal shaped honeycomb.
Figure 1B:
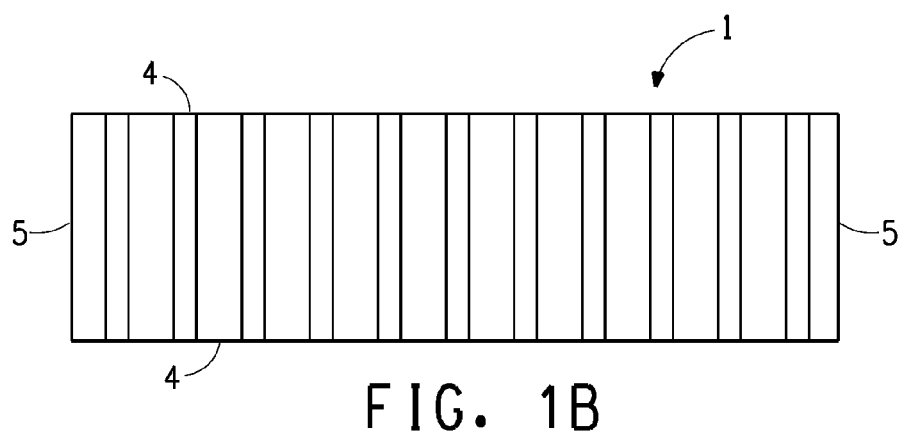
Figure 2:
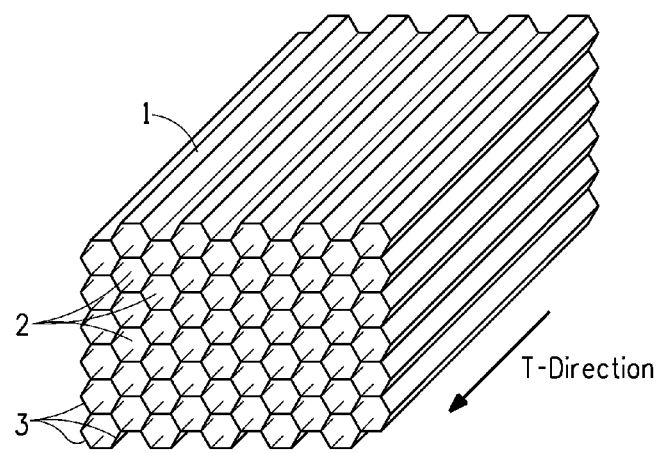
FIG. 2 is a representation of another view of a hexagonal cell shaped honeycomb.
Figure 3:
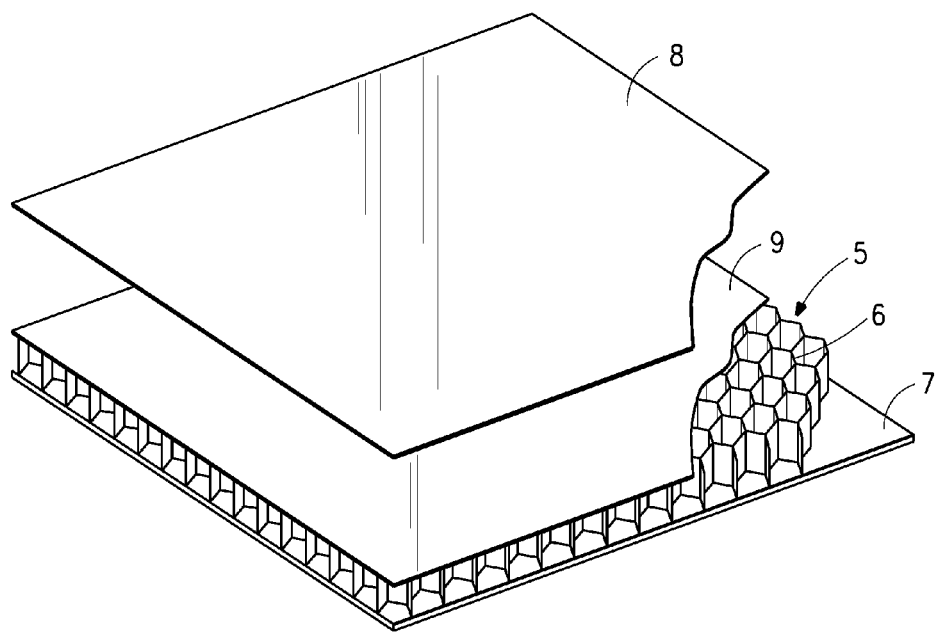
FIG. 3 is an illustration of honeycomb provided with facesheets.
Figure 4:
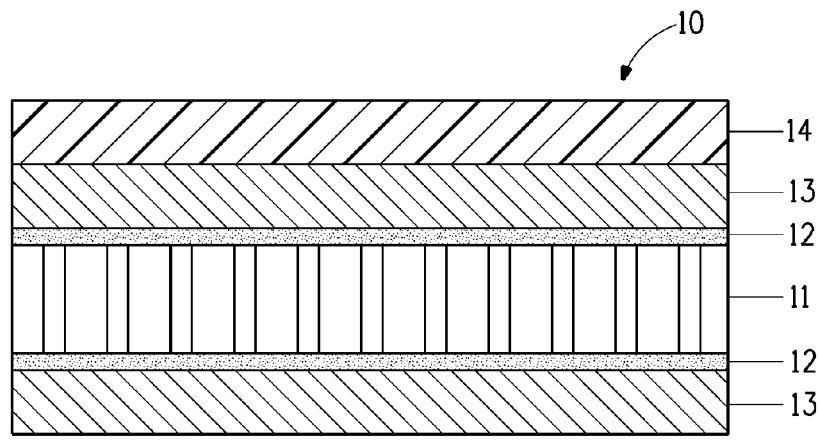
FIG. 4 is another illustration of honeycomb provided with facesheets.
Figure 5:
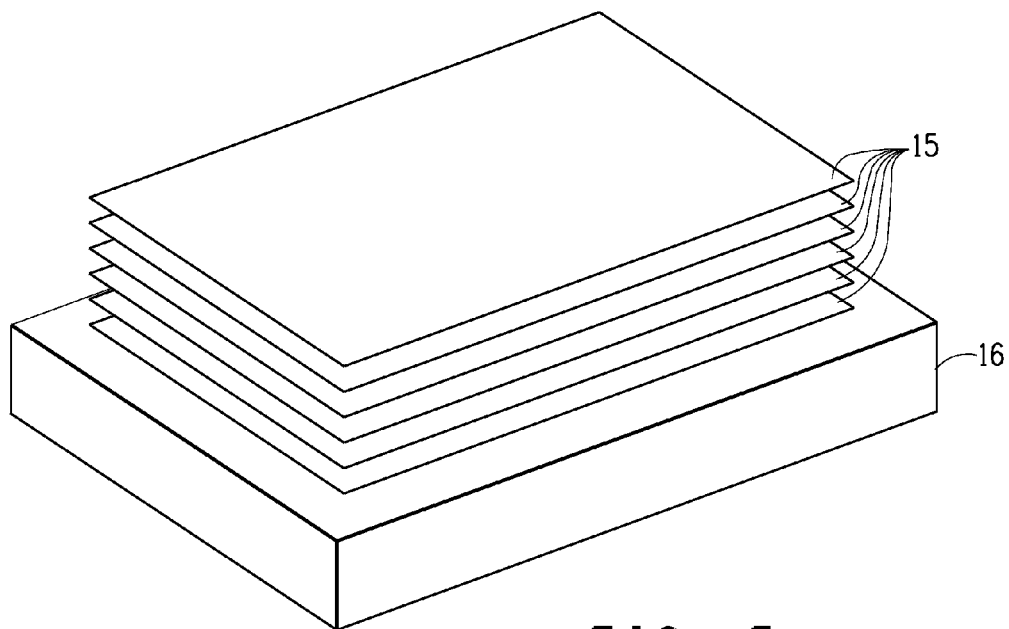
FIG. 5 is an illustration of an assembly for a monolithic composite structure.

FIG. 1A is a plan view illustration of a honeycomb 1 of this invention and shows cells 2 formed by cell walls 3. FIG. 1B is an elevation view of the honeycomb shown in FIG. 1A and shows the two exterior faces, or surfaces 4 formed at both ends of the cell walls. The core also has edges 5. FIG. 2 is a three-dimensional view of the honeycomb. Shown is honeycomb 1 having hexagonal cells 2 and cell walls 3. The "T" dimension or the thickness of the honeycomb is shown in FIG. 2. Hexagonal cells are shown; however, other geometric arrangements are possible with square, over-expanded and flex-core cells being among the most common possible arrangements. Such cell types are well known in the art and reference can be made to *Honeycomb Technology* by T. Bitzer (Chapman & Hall, publishers, 1997) for additional information on possible geometric cell types. FIG. 3 shows a structural sandwich panel 5 assembled from a honeycomb core 6 with facesheets 7 and 8, attached to the two exterior faces of the core. The facesheet material is a prepreg. In some circumstances, an adhesive film 9 is also used. This adhesive film is located such that one surface of the film, the inner film surface, is located against the core surface with the other surface, the outer film surface, in contact with the first prepreg facesheet. Normally, there are between two and twenty-five prepreg facesheets on either side of the core. FIG. 4 shows an alternative embodiment of a sandwich panel 10 assembled from a honeycomb core 11 with adhesive film 12 attached to the two exterior faces of the core and prepreg facesheets 13 located on top of the film. On one side of the assembly, the exterior side of the structure is a surfacing film 14. FIG. 5 shows an embodiment of an assembly of prepreg sheets 15 on a tool 16 to make a monolithic composite structure.

A necessary component of the invention is a prepreg. The prepreg resin includes a thermosetting resin, or a combination of thermosetting resins such as phenolic, epoxy, cyanate ester, bismaleimide, and the like, curing agents and a sufficient amount of a fibrous micropulp to provide a prepreg that, on cure, will function adequately as a fluid barrier in a cured panel. This prepreg is referred to as a fluid or moisture barrier prepreg. The term prepreg includes material forms such as molding compounds which are strands of chopped fiber impregnated with chopped resin and towpreg which is a continuous filament fiber tow pre-impregnated with resin.

The thermosetting resins which are combined with the fiber layer to form the moisture barrier prepreg in accordance with the present invention may be selected from a phenolic, epoxy, cyanate ester, polyimide or bismaleimide resin. Exemplary epoxy and cyanate ester resins include glycidylamine type epoxy resins, such as triglycidyl-p-aminophenol, tetraglycidyldiaminodiphenyl-m-ethane; glycidyl ether type epoxy resins, such as bisphenol A type epoxy resins, bisphenol F type epoxy resins, bisphenol S type epoxy resins, phenol novolak type epoxy resins, cresol novolak type epoxy resins and resorcinol type epoxy resins; cyanate esters, such as 1,1'-bis(4-cyanatophenyl)ethane (e.g. AroCy L-10, available from Huntsman, Inc., The Woodlands, Tex.), 1,3-Bis(4-cyanateophenyl-1-1-(1-methylethylidene) benzene (e.g.

RTX366, available from Huntsman). Epoxy resins are preferred. Especially preferred epoxy blends include a mixture of trifunctional epoxy and a difunctional bis-F epoxy.

The epoxy resin may be composed of trifunctional epoxy, difunctional epoxy and a wide variety of combinations of trifunctional and difunctional epoxies. Tetrafunctional epoxies may also be used. Exemplary trifunctional epoxy include triglycidyl p-aminophenol and N,N-Diglycidyl-4-glycidyloxyaniline (e.g. MY-0510 or MY-0500 available from Huntsman). Exemplary difunctional epoxies which may be used in the resin include Bis-F epoxies, such as GY-281, LY-9703 and GY-285 which are also available from Huntsman). Bis-A epoxies, such as GY-6010 (Huntsman) and DER 331 (Dow Chemical, Midland, M.I.) are suitable Bisphenol-A type epoxies and may also be used. An exemplary tetrafunctional epoxy is tetraglycidyl diaminodiphenyl methane (e.g. MY-721, MY-720 and MY-9512 available from Huntsman). Other suitable epoxies include phenol novolac type epoxy, cresol novolac epoxy and resorcinol type epoxy. Preferred bis-F epoxies include GY281 and GY285 that are available from Huntsman.

The curing agent is preferably an amine, an anhydride, a substituted urea or dicyandiamide. Combinations of curing agents can also be used. Exemplary curative agents include dicyandiamide, 3,3-diaminodiphenylsulfone (3,3-DDS), amino or glycidyl-silanes such as 3-amino propyltriethoxysilane, CuAcAc/Nonylphenol (1/0.1), 4,4'-diaminodiphenylsulfone (4,4'-DDS), 4,4'-methylenebis(2-isopropyl-6-methylaniline), e.g., Lonzacure M-MIPA (Lonza Corporation, Fair Lawn, N.J.), 4,4'-methylenebis(2,6-diisopropylaniline), e.g., Lonzacure M-DIPA (Lonza Corp.). Combinations of curatives such as 3,3-DDS and dicyandiamide may also be used.

The fibrous micropulp component of the prepreg resin is generally from 0.05 to 10.0, more preferably from 0.05 to 6.0 and most preferably from 0.05 to 3.0 weight percent of the fully formulated resin composition and has an average surface area ranging from 25 to 500 square meters per gram, preferably ranging from 25 to 200 square meters per gram and more preferably ranging from 30 to 80 square meters per gram. The volume weighted average length ranges from 0.01 micrometer to 100 micrometers, preferably ranging from 0.1 micrometer to 50 micrometers and more preferably from ranging from 0.1 micrometer to 10 micrometers. This micropulp is a fibrous organic material that includes an intermeshed combination of two or more webbed, dendritic, branched, mushroomed or fibril structures. The fiber feedstock for the micropulp has a tenacity of at least 3 grams per denier (2.7 grams per dtex).

Fibers suitable for conversion into micropulp used in the present invention can be made from polymers of aliphatic polyamides, polyesters, polyacrylonitriles, polyvinyl alcohols, polyolefins, polyvinyl chlorides, polyvinylidene chlorides, polyurethanes, polyfluorocarbons, polybenzimidazoles, polyphenylenetriazoles, polyphenylene sulfides, polyoxadiazoles, polyimides, aromatic polyamides, or a mixture thereof. More preferred polymers are made from aromatic polyamides, polybenzoxadiazole, polybenzimidazole, or a mixture thereof. Still more preferred organic fibers are aromatic polyamides ((p-phenylene terephthalamide), poly (m-phenylene isophthalamide), or a mixture thereof). More particularly, the aromatic polyamide fibers disclosed in U.S. Pat. Nos. 3,869,430; 3,869,429; 3,767,756; and 2,999,788 are preferred. Such aromatic polyamide organic fibers and various forms of these fibers are available from E.I. du Pont de Nemours and Company, Wilmington, Del. (DuPont), under the trademarks Kevlar® and Nomex®.

As employed herein the term aramid means a polyamide wherein at least 85% of the amide (—CONH—) linkages are attached directly to two aromatic rings. Additives can be used with the aramid. In fact, it has been found that up to as much as 10 percent, by weight, of other polymeric material can be blended with the aramid or that copolymers can be used having as much as 10 percent of other diamine substituted for the diamine of the aramid or as much as 10 percent of other diacid chloride substituted for the diacid chloride of the aramid. Para aramid fibers and various forms of these fibers are available from DuPont under the trademark Kevlar® and from Teijin, Ltd., under the trademark Twaron®.

Other suitable commercial polymer fibers for conversion to micropulp are Zylon® PBO-AS (Poly(p-phenylene-2,6-benzobisoxazole) fiber, Zylon® PBO-HM (Poly(p-phenylene-2,6-benzobisoxazole)) fiber, Dyneema® SK60 and SK71 ultra high strength polyethylene fiber, all supplied by Toyobo, Japan; Celanese Vectran® HS pulp, EFT 1063-178, supplied by Engineering Fibers Technology, Shelton, Conn.; CFF Fibrillated Acrylic Fiber supplied by Sterling Fibers Inc, Pace, Fla.; and Tiara Aramid KY-400S Pulp supplied by Daicel Chemical Industries, Ltd, 1 Teppo-Cho, Sakai City Japan. Natural fibers, such as cellulose, cotton and wool fibers can also be utilized.

Micropulp suitable for use in this invention can be made by the method disclosed in United States Patent Publication No. 20030114641 A1 to Kelly et al. The micropulp can be incorporated into the resin mix in one of two ways. It may be added directly into the resin or as a resin and/or solvent pre-mix. Suitable solvents include methanol, methylethylketone and dichloromethane. Methods of preparing such micropulp premixes are described in US Patent Publication No. 2004/0191192 A1 to Blankenbeckler et al. Resins incorporating from 0.05 to 10.0, more preferably from 0.05 to 6.0 and most preferably from 0.05 to 3.0 weight percent of micropulp prepared in this way can also be used for resin transfer molding (RTM), pultrusion and filament winding applications. Such processes, preferably utilizing epoxy resins, are well understood by those skilled in the art.

Other performance enhancing materials or modifiers may also be incorporated into the resin formulation. Non-limiting examples of these, which may be used alone or in combination, include diluents, viscosity control agents, flame-retardants, tougheners, UV stabilizers and anti-fungal agents. Viscosity control additives are frequently used. The viscosity control agent is preferably a thermoplastic material that dissolves in the thermosetting resin.

Exemplary viscosity control agents include thermoplastic polyetherimides such as ULTEM® 1000P which is available from General Electric (Pittsfield, Mass.); micronized polyethersulfone (PES) such as 5003P, which is available from Sumitomo Chemical Co., Ltd. (Osaka, Japan) and polyimide MATRIMID® 9725, which is available from Huntsman. ULTEM® 1000P and micronized PES are preferred. Micronized PES is especially preferred. The amount and type of viscosity control agent that is added to the epoxy resin mixture may be varied to provide the desired viscosity.

Further information on typical formulations is available in the chapter on epoxy resins in the ASM Handbook, Volume 21, Composites, 2001.

An exemplary prepreg resin formulation for moisture barrier prepreg is as follows:

1 to 70 parts by weight of an epoxy;
5 to 40 parts by weight of an amine curing agent;
1 to 30 parts by weight of a viscosity control agent; and
0.1 to 10 parts by weight of fibrous micropulp.

In another embodiment, the prepreg resin formulation for moisture barrier prepreg is as follows:

10 to 40 parts by weight of a trifunctional epoxy resin;
10 to 40 parts by weight of a difunctional epoxy resin;
11 to 25 parts by weight of an aromatic curing agent;
0 to 3 parts by weight of a non-aromatic curing agent; and
5 to 15 parts by weight of a viscosity control agent
0.1 to 10 parts by weight of fibrous micropulp.

The finished resin is applied to the desired fibers to form a prepreg. The resin content of the prepreg may be varied depending upon a number of different parameters in order to achieve desired mechanical and structural properties for the composite panel. It is preferred that the prepreg has a resin content from 30 to 45 weight percent and a fiber content of from 55 to 70 weight percent. Methods of combining the resin and fiber to make prepreg, either by a solvent or solvent-free (hot melt) method, are well known to those skilled in the art and are further detailed on page 56 of "Manufacturing Processes for Advanced Composites" by F. C. Campbell, Elsevier and in "Prepreg Technology" product literature from Hexcel Corporation.

The reinforcement fibers that are used in the prepreg can be any of the fiber materials that are used to form composite laminates. Exemplary fiber materials include glass, aramid, carbon, ceramic and hybrids thereof. The fibers may be woven, unidirectional or in the form of random fiber mat. Preferred woven forms are plain, satin or twill weave fabrics woven from carbon or glass fibers. Such materials are available from Hexcel or BGF Industries Inc., Greensboro, N.C.

In another embodiment of this invention, a further necessary component is a honeycomb. Exemplary honeycomb materials for use in this invention include aluminum, aramid, carbon or glass fiber. Preferred materials are meta-aramid such as Nomex® para-aramid such as Kevlar® and 5052 or 5056 grade aluminum alloys. The dimensions of the honeycomb can be varied widely. Typically, the honeycomb cores will have ⅛ to ½ inch (3.2-12.7 mm) cells with the cores being ¼ inch (6.4 mm) to 2 inches (50.8 mm) thick. Cell size is the diameter of an inscribed circle within the cell of a honeycomb core. The final core densities are normally in the range of 2-12 lb. per cu.ft. (32-192 kg/m$^3$). Honeycomb core is available from companies such as Euro-Composites, Elkwood, Va., Hexcel Corporation, Casa Grande, Ariz. and M.G. Gill Corporation, El Monte, Calif.

In accordance with the present invention, fluid barrier prepreg, 15 in FIG. 5, may be assembled on a mold, 16 in FIG. 5, and cured to form a composite material structure having an improved resistance to fluid permeation. The composite structure may further comprise a honeycomb core. Depending on the desired design of the structural part the number of prepreg sheets or plies required can be between one and thirty. Although the prepreg of this invention can provide structural properties, the composite panels may also contain prepreg sheets that do not possess fluid impermeation properties but function purely in a structural role. Such prepregs are widely available in the composite materials industry, an example being Cyclom® 970 from Cytec Engineered Materials, Tempe, Ariz. The relative amounts of different prepregs used can be optimized to meet design needs.

The preparation of monolithic or core based structural composite panels from prepreg and core involves techniques well known in the art. The principal methods are autoclave, hot press and vacuum bag curing technology. These techniques are explained in more detail in the chapter on curing in the ASM Handbook, Volume 21, Composites, 2001. The amount of vacuum, pressure and heat required to cure and bond the panel components may be varied depending upon the particular resin formulation and the amount of resin in the prepreg. In general, sufficient pressure must be applied to the prepreg to ensure that the resin adequately flows throughout the structure. In the case of a honeycomb panel structure, resin flow to provide adequate fillet formation on the core edges is also important.

In another embodiment of this invention, the aramid fiber micropulp may be incorporated into a film adhesive that forms part of the sandwich panel assembly. Although such film adhesives are normally located next to the core as shown at 9 in FIG. 3 or as an outer surfacing layer as shown at 14 in FIG. 4, they could also be positioned between prepreg sheets. These adhesives are based on epoxy, bismaleimide, phenolic, polyimide and cyanate ester chemistries similar to those in prepreg resins. Aluminum, silica and flame-retardants are also commonly used ingredients. Films can also be provided with a carrier cloth, an example being a knit tricot cloth of polyester yarn. The amount of aramid fiber micropulp in a film formulation, excluding the carrier, is generally from 0.05 to 10.0, more preferably from 0.05 to 6.0 and most preferably from 0.05 to 3.0 weight percent of the fully formulated film composition. The pulp has the same properties as that used in the prepreg resin. Both film and prepreg may be utilized in the same assembly as fluid impermeable facesheets.

Yet another embodiment of this invention is the incorporation of aramid fiber micropulp into an adhesive paste or syntactic for use in insert-potting or core edge filling applications. Insert potting is the bonding of location attachments into the sandwich panel positioned where fasteners must be put through the panel. This bonding is normally done as a co-curing operation with the prepreg curing. Core edge filling is carried out after panel cure and seals the core edges, 5 in FIG. 1B, from damage and moisture ingress. The process involves mechanically removing the honeycomb core ½ to 1 cell deep about the entire periphery of the panel edge and then hand filling the resulting open core area with resin. After the resin cures, the edge is either machined or hand sanded smooth and flush with the edges of the panel. These potting and cell edge-sealing adhesives are based on epoxy, bismaleimide, and polyimide chemistries similar to those in prepreg resins. Fillers such as milled fibers or microballoons as well as flame retardants are also commonly used ingredients. The amount of aramid fiber micropulp in a paste or syntactic formulation is generally from 0.05 to 10.0, more preferably from 0.05 to 6.0 and most preferably from 0.05 to 3.0 weight percent of the fully formulated composition. The pulp has the same properties as that used in the prepreg resin.

EXAMPLES

In the examples, all parts and percentages are by weight and degrees in centigrade unless otherwise set forth:

Example 1

Resin can be prepared having the following formulation:
26.1 percent MY-0510 (N,N-Diglycidyl-4-glycidyloxyaniline)
24.2 percent GY285 (bis-F epoxy)
15.3 percent 3,3'-Diaminodiphenylsulfone
1.3 percent Dicyandiamide
13.1 percent micronized Polyethersulfone (PES)
17.0 percent densified Polyethersulfone (PES)
3.0 percent of aramid fiber micropulp.

The densified PES is made from PES 5003P that is available from Sumitomo Chemical Co. Ltd. (Osaka, Japan). The PES is densified in accordance with U.S. Pat. No. 4,945,154. The densified PES has an average particle size of 1025 micrometers with no more than 13 weight percent smaller than 5 micrometers and no more than 4 weight percent greater than 40 micrometers.

24.2% of GY285 and 6.0% of MY0510 are mixed in a resin kettle and heated, with stirring, to 65 degrees. Once this temperature is attained, 13.1% micronized PES 5003P is added to the resin kettle. The mixture is then heated to 128 degrees and held at this temperature for 75 minutes. At the end of 75 minutes, heating is removed and 20.1% of MY0510 is added to the kettle. Stirring is continued as the mixture cools to 65 degrees. 15.3% of 3,3-DDS is added and mixed for 15 minutes. 1.3% of dicyandiamide is then added and the mixture stirred for 5 minutes at 65 degrees. Finally, 17.0% of densified PES and 3.0% of aramid fiber pulp is added and stirred in for 15 minutes at 65 degrees.

Honeycomb sandwich panels are prepared by first forming a prepreg of 193 grams per square meter (gsm) plain weave 3K carbon fiber fabric and 138 gsm of resin. The prepreg is formed as follows:

The resin is coated on release paper by a reverse roll process at about 79 degrees to form a film containing 69 gsm of resin. Two resin films are impregnated into the carbon fiber fabric.

The prepreg is applied to ½ inch (1.27 cm) thick, ⅛ inch (0.31 cm) cell size Nomex® honeycomb type HRH®10 from Hexcel under vacuum at 22 inches (56 cm) Hg and cured for 2 hours at 177 degrees with a pressure of 45 psi, venting at 20 psi and ramp cooling at a rate of 2 degrees per minute.

Comparative Example 1

A resin can be prepared having the following formulation:
27.0 weight percent MY-0510 (N,N-Diglycidyl-4-glycidyloxyaniline)
24.9 weight percent GY285 (bis-F epoxy)
15.8 weight percent 3,3'-Diaminodiphenylsulfone
1.3 weight percent Dicyandiamide
13.5 weight percent micronized Polyethersulfone (PES)
17.5 weight percent densified Polyethersulfone (PES)

The resin mixing procedure is as in Example 1, except that no aramid micropulp is added. The steps of making prepreg and sandwich panels are also as in Example 1.

Test coupons from Example 1 and Comparative Example 1 can be subjected to fluid exposure in a test chamber having controlled temperature and relative humidity. The samples are weighed before and after exposure with the weight difference representing the amount of fluid absorbed. Panels containing the fluid barrier prepreg facesheets will have less fluid ingression. Coupons from a monolithic structure can be tested according to ASTM 5229, while for honeycomb structures, a suitable test procedure is described in "Moisture Ingression in Honeycomb Core Sandwich Panels" by Cise et. al. in the Journal of Materials Engineering and Performance, Volume 6(6), 732, December 1997.

What is claimed is:

1. A cured composite material structure comprising
   (a) at least one fiber layer;
   (b) a resin which has been combined with said fiber layer to form a prepreg, said resin comprising a thermoset resin, at least one curing agent and from 0.05 to 10.0 weight percent of a fibrous micropulp, said micropulp fiber having a tenacity of at least 3 grams per denier and a volume average length of from 0.01 to 100 micrometers and further comprising a honeycomb core.

* * * * *